United States Patent [19]
Aziz et al.

[11] Patent Number: 6,046,691
[45] Date of Patent: Apr. 4, 2000

[54] RATE 16/17 (0,5) MODULATION CODE APPARATUS AND METHOD FOR PARTIAL RESPONSE MAGNETIC RECORDING CHANNELS

[75] Inventors: Pervez M. Aziz, South Whitehall; Patrick W. Kempsey, Catasauqua; Srinivasan Surendran, Whitehall, all of Pa.

[73] Assignee: Lucent Technologies Inc., Murray Hill, N.J.

[21] Appl. No.: 09/059,061

[22] Filed: Apr. 13, 1998

[51] Int. Cl.[7] .................................................. H03M 7/00
[52] U.S. Cl. .................................. 341/58; 360/40; 341/59
[58] Field of Search ........................................ 341/58, 59

[56] References Cited

U.S. PATENT DOCUMENTS

| | | |
|---|---|---|
| 4,486,739 | 12/1984 | Franaszek et al. . |
| 4,707,681 | 11/1987 | Eggenberger et al. . |
| 5,260,703 | 11/1993 | Nguyen et al. . |
| 5,537,112 | 7/1996 | Tsang . |
| 5,604,497 | 2/1997 | Sonntag . |
| 5,635,933 | 6/1997 | Fitzpatrick et al. . |
| 5,781,133 | 7/1998 | Tsang .......................... 341/59 |
| 5,784,010 | 7/1998 | Coker et al. ................. 341/59 |
| 5,933,103 | 8/1999 | Kim ............................. 341/59 |

*Primary Examiner*—Howard L. Williams

[57] ABSTRACT

A system and method employing a rate 16/17 (0,5) code constructed in accordance with a set of pivot bits and a set of corrections for predefined code violations limits the number of consecutive zeros seen by a channel to five. The rate 16/17 (0,5) code is suitable for magnetic or similar recording media and may be employed in partial response maximum likelihood read channels. A feature of the constructed code is a high transition density which allows for more frequent timing and gain control updates, which results in lower required channel input signal to noise ratio for a given channel performance. Each constructed codeword is block encodable and block decodable, and the code construction allows for efficient circuit implementation in both an encoder and a decoder.

20 Claims, 8 Drawing Sheets

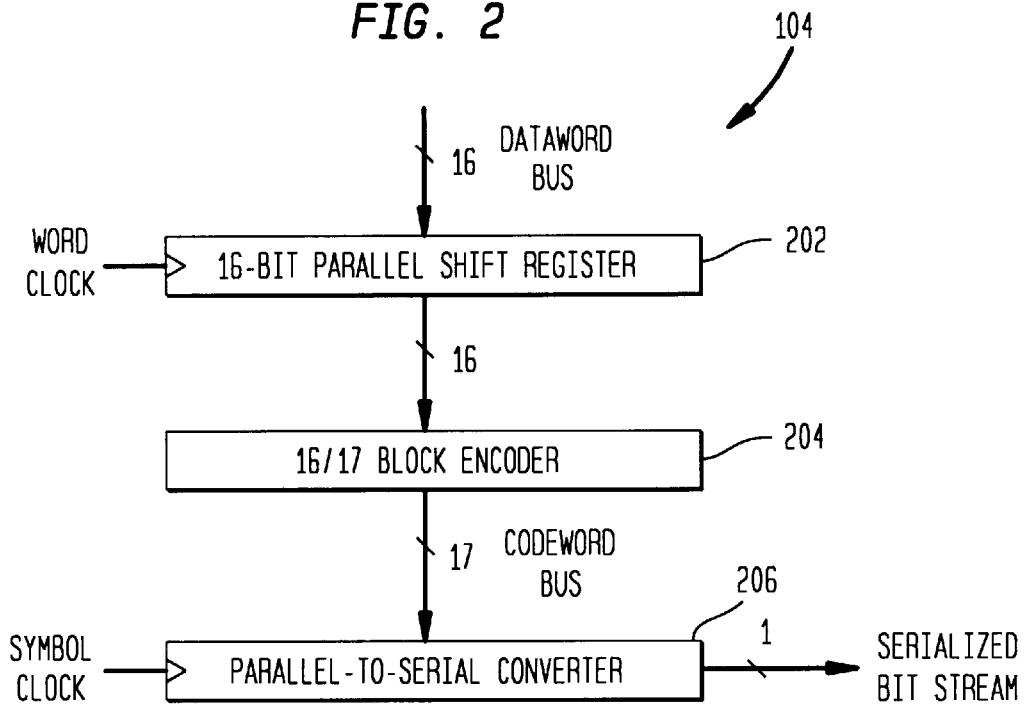
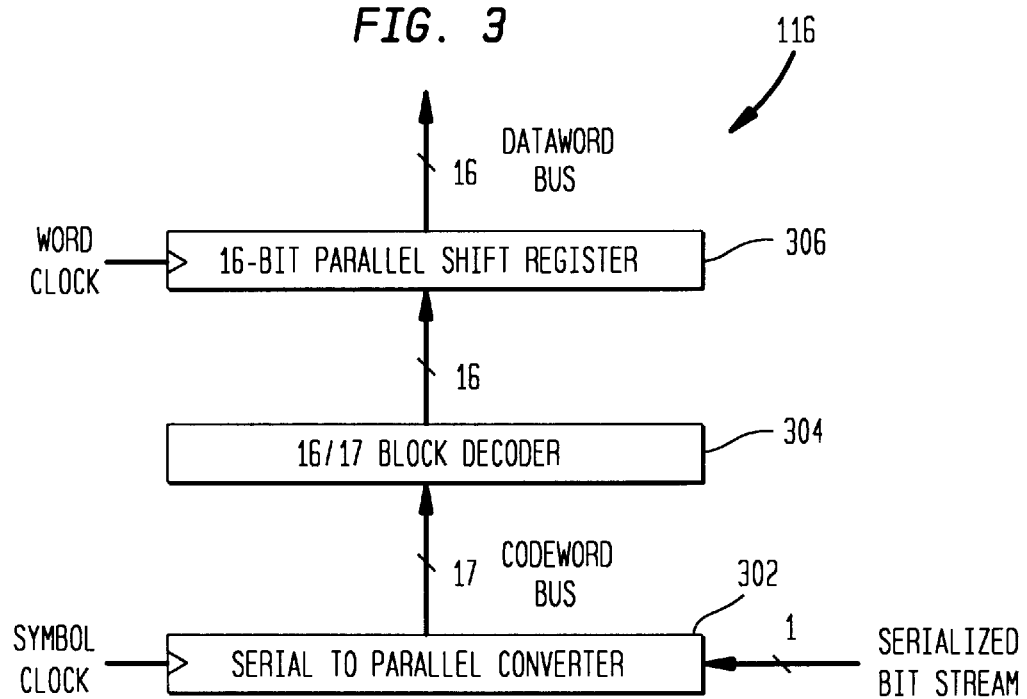

RATE 16/17 (0,5) MODULATION CODE APPARATUS AND METHOD FOR PARTIAL RESPONSE MAGNETIC RECORDING CHANNELS

FIELD OF THE INVENTION

The present invention relates in general to modulation codes for modulation encoding and decoding systems, and, more particularly, to a system employing a 16/17 (0,5) modulation code.

BACKGROUND OF THE INVENTION

Many conventional magnetic recording systems include partial response or peak-detection magnetic recording channels for data detection. Data detection within a digital communication channel is generally based on periodically sampling the amplitude of the transmitted signal. Enhancements to encoding techniques extend the performance of partial response and peak detection systems by allowing more transitions without degrading data detection.

Modulation codes may be employed to achieve high transition densities within magnetic recording systems. High transition densities allow more frequent timing and gain control updates, which, in turn, result in a lower required channel input signal to noise ratio (SNR) for a given magnetic recording channel performance. In a typical system, data are first encoded with an error correction code, and then encoded with a modulation code using a modulation encoder and precoder before the encoded data are written to a recording channel of a magnetic recording media, such as disk or tape. When the magnetic recording channel is read from the media by a head, an equalizer equalizes the readback signal to a target partial response (PR). The equalized signal may then be applied to a maximum likelihood (ML) sequence detector, also known as a Viterbi detector, to reconstruct the modulation-coded encoded data signal. The reconstructed signal may then be subject to inverse coding operations, such as unprecoding, modulation decoding, and then error correction decoding.

The modulation encoder and precoder are employed to provide that timing recovery circuitry and gain control circuitry as used with the equalizer receive non-zero or other active information frequently, without degrading the efficacy of the ML sequence detector to correctly detect the sequence for a given PR. The modulation encoder receives a group of M bits and encodes the M bits as a group of N channel bits such that the group of N channel bits satisfy a given constraint. Several properties are desirable for a modulation code for ease of implementation of a modulation encoder. First, the modulation code should be a block code where no apriori knowledge of bits or other bit group information outside the given group of M bits and N bits is required. Second, the code should have a high rate or coding density of M/N, and third, the code should have good constraints. Fourth, the code should be efficiently implemented in a logic circuit, and fifth, the code should not affect the efficacy of the ML sequence detector.

Run length limited (RLL) block codes may be typically used for the modulation code, and these RLL block codes may be characterized by the coding density of M/N, where M is an integer, which is usually either a multiple or submultiple of the number 8, and N is a larger integer than M. M data bits are coded into N symbols, or channel bits, with the constraint that M be a multiple or submultiple of 8 arising from the outer, error correcting code working on a byte by byte basis. Decoding a block of channel bits which contains one or more errors contaminates an entire block; accordingly, alignment of block boundaries with byte boundaries reduces the number of contaminated bytes.

RLL block codes are also characterized by run length constraints, labeled as (d,G/I), where d is the minimum number of zeros between ones, G is the maximum number of zeros, between ones, and I is the maximum number of zeros between ones in odd/even substrings. For high density codes, d=0, while the G constraint ensures sufficient transitions for the timing recovery and gain control functions. Depending on the PR, the I constraint, and/or the G constraint, avoids quasi-catastrophic sequences which may reduce the effectiveness of ML sequence detectors.

The I constraint is generally only useful for some PR channels, an example of which is a channel with a partial response transfer function of the form $1-D^2$, also known as a PR4 channel. Other PR channels may be used; for example; an EPR4 channel, which is characterized by the channel's partial response transfer function, or polynomial, being $1+D-D^2-D^3$, may be used. For the EPR4 channel, the G constraint itself, in conjunction with a $1/(1 \oplus D^2)$ precoder, provides sufficient timing and/or gain control information while limiting the quasi-catastrophic sequences. PRML magnetic read channels of the prior art have employed a popular 8/9 code with constraints (0,4,4), such as is described in U.S. Pat. No. 4,707,681, entitled METHOD AND APPARATUS FOR IMPLEMENTING OPTIMUM PRML CODES, to Eggenberger et al., and which is incorporated herein by reference. This lower rate code has been extended to a higher rate of 16/17, disclosed in U.S. Pat. No. 5,604,497, entitled APPARATUS AND METHOD FOR INCREASING DENSITY OF RUN LENGTH LIMITED BLOCK CODES WITHOUT INCREASING ERROR PROPAGATION, to Jeffrey L. Sonntag, and which is incorporated herein by reference. These types of codes yield a high rate but at the expense of degrading the G and I constraints, which become, for example, (0, G=12, I=8). Further, rate 16/17 codes have been constructed which are not derived from a lower rate 8/9 code, and this construction is described in, for example, U.S. Pat. No. 5,635,933, entitled RATE 16/17 (D=0, G=6/I=7) MODULATION CODE FOR A MAGNETIC RECORDING CHANNEL, to Fitzpatrick et al., which is incorporated herein by reference.

SUMMARY OF THE INVENTION

The present invention relates to an apparatus and method for an encoder and a decoder in which a dataword is encoded as a codeword. In accordance with the present invention, the dataword is related to a codeword by first dividing the dataword into first and second bit strings and inserting a pivot bit between the first and second strings.

Whether each of the first and second bit strings contains at least one code violation is determined, each code violation corresponding to a given bit sequence, and then any code violation in the first and second bit strings is corrected, as necessary, by: (1) defining values for one or more bits in each of the first and second bit strings as additional pivot bits, the additional pivot bits identifying a type and a position of the code violation; (2) preserving values for bits not included in the given bit sequence corresponding to the code violation; and (3) assigning values, as necessary, for one or more bits of the given bit sequence.

BRIEF DESCRIPTION OF THE DRAWINGS

The aforementioned features and benefits of the invention will be better understood from a consideration of the detailed description which follows taken in conjunction with the accompanying drawings, in which:

FIG. 2 is a block diagram showing a modulation encoder in accordance with an exemplary embodiment of the present invention;

FIG. 3 is a block diagram showing a modulation decoder in accordance with an exemplary embodiment of the present invention;

DETAILED DESCRIPTION

Magnetic Recording System

The present invention relates to a system and method employing a rate 16/17 (0,5) code constructed in accordance with a set of pivot bits and a set of corrections for predefined code violations which, for the exemplary embodiments as described below, limits the number of consecutive zeros seen by a channel to five, thereby resulting in a G constraint of five. For the present invention, the I constraint is not necessary and is dropped from the notation and code construction requirements. The constructed code includes a high transition density which allows for more frequent timing and gain control updates, which results in lower required channel input signal to noise ratio for a given channel performance. Each constructed codeword is block encodable and block decodable, and the code construction allows for efficient circuit implementation in both an encoder and a decoder.

Figure 1:
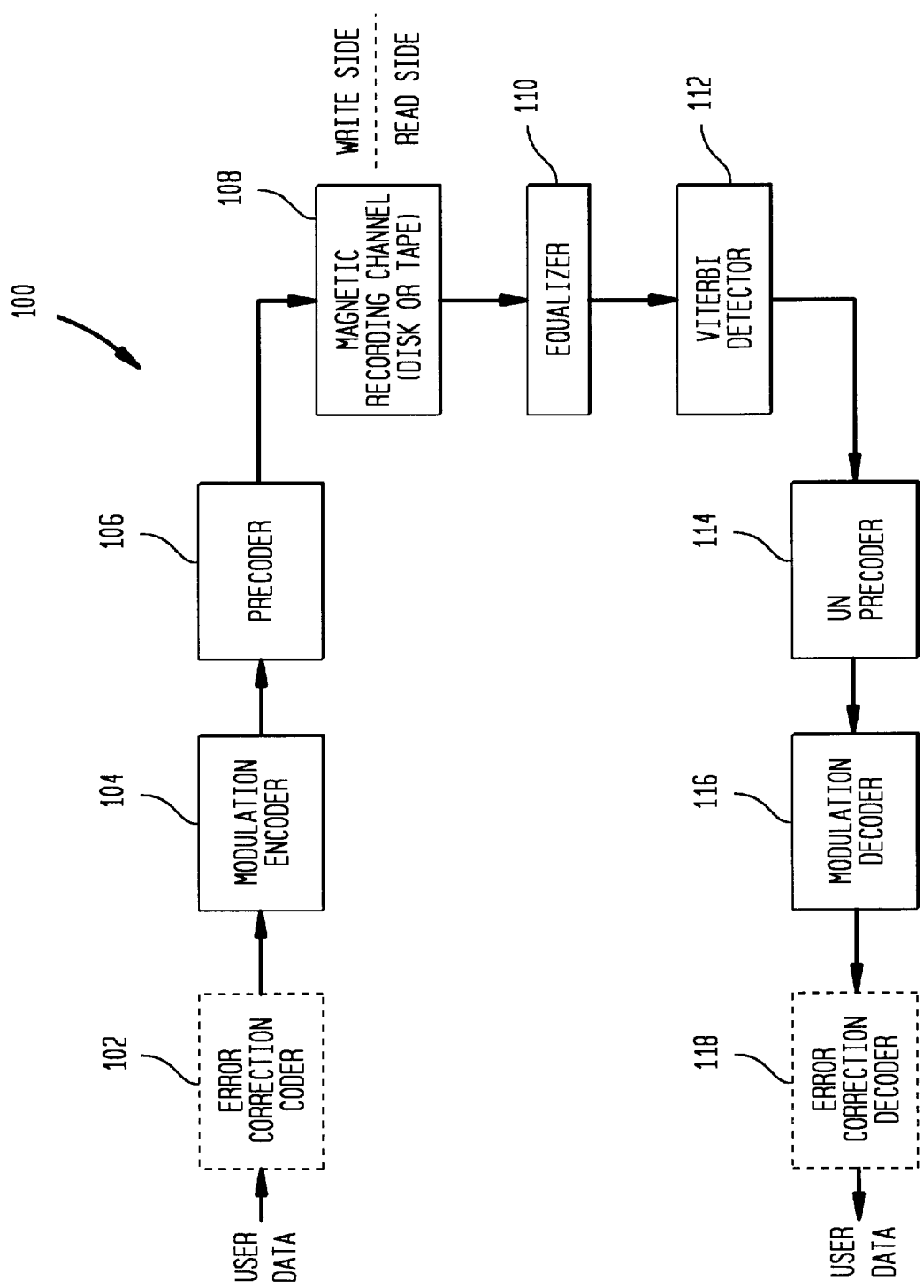
FIG. 1 is a block diagram showing a system having a modulation encoder and a modulation decoder employing a rate 16/17 (0,5) code in accordance with an exemplary embodiment of the present invention.

FIG. 1 is a block diagram showing a modulation encoder and a modulation decoder system 100 employing a rate 16/17 (0,5) code in accordance with an exemplary embodiment of the present invention. As shown in FIG. 1, the system 100 includes an encoding section having an optional error correction coder 102, modulation encoder 104, and precoder 106; and the system 100 includes a decoding section including an equalizer 110, sequence detector 112, unprecoder 114, modulation decoder 116 and optional error correction decoder 118. Coded information from the encoding section is written to a magnetic recording channel 108, which may be magnetic disk or tape media, and the coded information is read from the magnetic recording channel 108 by the decoding section.

The modulation encoder 104 receives data as sequential datawords, each dataword a being a bitstring a(1), a(2), . . . a(L), L an integer. Optional error correction coder 102 may receive user data and encode the user data using error correction techniques as are known in the art to provide these datawords. The modulation encoder 104 encodes the datawords as 16/17 (0,5) output codewords (ẑ's) in accordance with the present invention. These output codewords are then subject to a precoding process by precoder 106. As is known in the art, the precoder 106 is used to verify that the output codewords of the modulation encoder 106 satisfy constraints of peripheral gain control and timing recovery circuits, such as an all 1's, an all 0's and/or an alternating 101010 . . . sequence being encoded and recorded as different, predefined bit sequences. Such precoder 106 may be, for example, a precoder of the form $1/(1 \Omega D^2)$.

The output sequence of the precoder 106 is then written to the magnetic recording channel 108 using, for example, a recording head, and then read from the magnetic recoding channel 108 by a device such as, for example, a readback head. The received signal is then equalized within equalizer 110 such that the equalized signal corresponds to the partial response transfer function, EPR4 for example, which is also represents a output channel response polynomial corresponding to the received sequence of levels. The received sequence is provided to the sequence detector 112. Sequence detector 112, which may be a Viterbi detector, determines a sequence of symbols in a state trellis structure which is closest to the received sequence of levels according to a predefined metric. The sequence detector 112 then provides the determined sequence of symbols as the output symbol sequence.

The unprecoder 114 receives the output symbol sequences and reverses the preceding operation of the precoder 106, and then provides output codewords to the modulation decoder 116. Modulation decoder 116 decodes the codewords of rate 16/17 (0,5) in accordance with the present invention to provide a sequence of datawords. Optional error correction decoder 118 may then be used to perform error correction processing to provide reconstructed user data.

Block Encoding

The modulation encoder 104 of FIG. 1 codes datawords a in accordance with the 16/17 (0,5) encoding construction as described subsequently. FIG. 2 is a block diagram showing a block diagram of modulation encoder 104 in accordance with an exemplary embodiment of the present invention. The block encoder includes a parallel shift register 202, 16/17 block encoder 204 and parallel to serial converter 206. Datawords of 16 bits in parallel are received by shift register 202 and sequentially provided as 16-bit parallel words to the 16/17 block encoder 204 in accordance with a word clock signal. 16/17 block encoder constructs 16/17 (0,5) output codeword ẑ based on the input dataword â, and these codewords are provided as 17-bit parallel words which are converted to a serial bit stream by parallel to serial converter 206 in accordance with a symbol clock signal.

Figure 4:
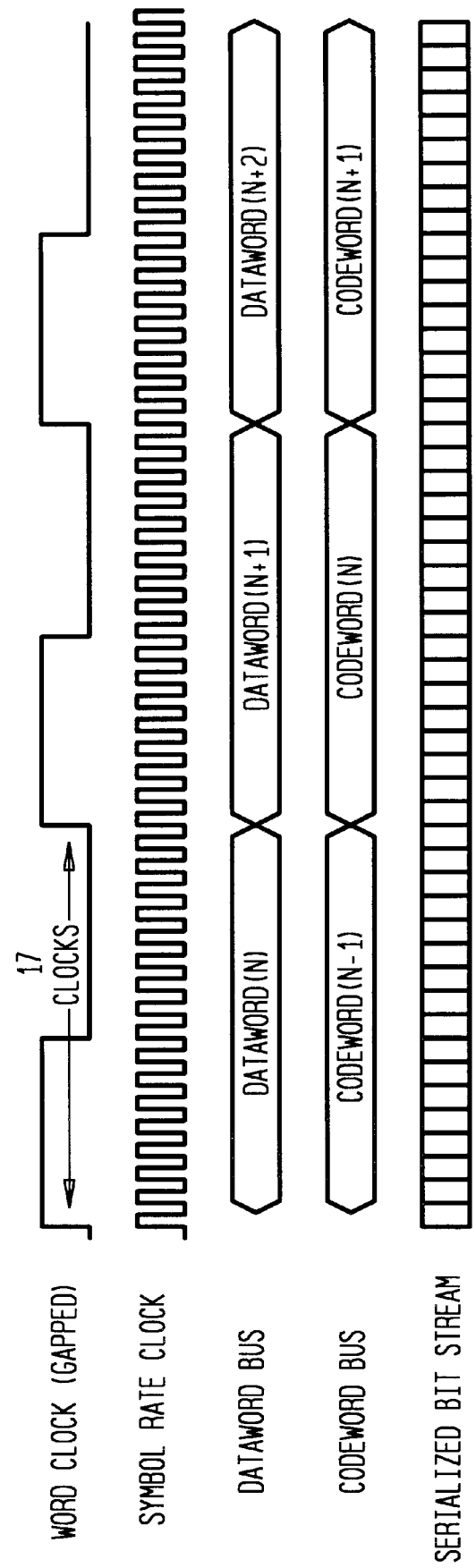
FIG. 4 is a timing diagram showing the timing relationship between data words and codewords for the modulation encoder of FIG. 3.

FIG. 4 is a timing diagram showing the timing relationship between data words and codewords for the modulation encoder of FIG. 2. As shown in the timing diagram of FIG. 4, each word is provided to a parallel shift register 202 of FIG. 2, in accordance with the word clock signal which has a period equal to 17 symbol clock cycles of the symbol clock signal. The 16/17 block encoder in accordance with the present invention constructs codewords in a single word clock period. For example, the 17 bit codeword of time (n−1) is converted to the serial bit stream during the same period that the 16 bit dataword of time (n) is converted to the next 17 bit codeword of time (n). Consequently, the exemplary embodiment of the modulation encoder 104 (FIG. 1) has an increased throughput and relatively low circuit complexity.

Code Construction

The 16/17 block encoder 204 of FIG. 2 constructs an output codeword from the input dataword â. Assuming an input dataword â having 16 bits, construction of an output codeword $\hat{z}=z(1),z(2), \ldots z(17)$ from the dataword $\hat{a}=a(1), a(2) \ldots a(16)$ using a 16/17 (0,5) block code is now described. The dataword â is first split into two bit-strings of element values, such as, for example, a left string including dataword element values a(1) through a(8) and a right string including dataword element values a(9) through a(16). Next, a temporary 17 bit output codeword $\hat{x}=x(1),x(2), \ldots x(17)$ is formed from the left and right strings by inserting a pivot bit, pb, in the middle of the dataword â a between the left and right strings. The pivot bit, pb, is initially set to, for example, a "1" corresponding to the value of element x(9) of x̂ and so forming the temporary codeword x̂ shown in Table 1:

respectively assigned to the output element values of the output codeword ẑ. If, however, one or more of the code violations as given in Table 2 occur, the 16/17 block encoder corrects each code violation. When a violation is identified, the pivot bit pb of x(9) is set to 0 to allow a decoder in accordance with the present invention to identify a codeword ẑ which contains a dataword a having at least one violation.

Three violation cases are possible: a first case in which violations occur only in the left string, a second case in which violations occur only in the right string, and a third case in which violations occur in both the left and right strings. For each of the three cases a different operation is performed to correct the code violations. To identify these cases, additional pivot bits are defined as pb1=x(8), pb2=x(10), pb1a=x(3), pb2a=x(15).

For the first case in which violations only occur in the left string, one or more violations of types 11, 12 and 13 may occur. As a first step, the pivot bit pb1 is set to 0 and the pivot bit pb2 is set to 1 to allow a decoder in accordance with the present invention to identify a codeword which contains a dataword â having left string-only violations of the first case. No further modifications are made to the right string for this first case;

consequently, modifications to the element values of the left string may not cause code violations to subsequently

TABLE 1

| x(1) | x(2) | x(3) | x(4) | x(5) | x(6) | x(7) | x(8) | x(9) | x(10) | x(11) | x(12) | x(13) | x(14) | x(15) | x(16) | x(17) |
|---|---|---|---|---|---|---|---|---|---|---|---|---|---|---|---|---|
| a(1) | a(2) | a(3) | a(4) | a(5) | a(6) | a(7) | a(8) | 1 | a(9) | a(10) | a(11) | a(12) | a(13) | a(14) | a(15) | a(16) |

After the temporary codeword x̂ is formed, a next step of the code construction is to define a set of code violations. For example, for a (0,5) code there may not be more than two zeros at either the beginning or end positions of the bit string of the output codeword ẑ, and/or there may be no more than five consecutive zeros within the bit string of the output codeword ẑ. Code violations may first be classified by whether the code violation occurs within the left bit string or within the right bit string of temporary codeword x̂, and these left and right string code violation classifications are identified by the labels "l" and "r" respectively. Second, the code violations may be classified as being either a type 1, type 2, or type 3 violation based on the position of the code violation within the left or right string of temporary codeword x̂. Therefore, these classifications of code violations are as summarized in Table 2:

TABLE 2

| Violation Name | Violation |
|---|---|
| l1 | x(1), x(2) and x(3) = 0 (or equivalently, a(1), a(2) and a(3) = 0) |
| l2 | x(2), x(3), x(4), x(5), x(6) and x(7) = 0 (or equivalently, a(2), ... a(7) = 0) |
| l3 | x(3), x(4), x(5), x(6) x(7) and x(8) = 0 (or equivalently, a(3), ... a(8) = 0) |
| r1 | x(15), x(16) and x(17) = 0 (or equivalently, a(14), a(15) and a(16) = 0) |
| r2 | x(11), x(12), x(13), x(14), x(15) and x(16) = 0 (or equivalently, a(10), ... a(15) = 0) |
| r3 | x(10), x(11), x(12), x(13) x(14) and x(15) = 0 (or equivalently, a(9), ... a(14) = 0) |

If none of the code violations as given in Table 2 occur in the temporary codeword x̂, then the element values of x̂ are occur within the right string since pb2 is set to 1. Since the pivot bits pb1 and pb2 are employed at the position of bits a(8) and a(9), respectively, of the input dataword â, the values of a(8) and a(9) are desirably preserved and stored in the left string.

Once the code violations are identified and pivot bits set for the first case, as a second step an encoder process corrects these violations. Since a violation at a position in the left string corresponds to zero values at that position based on the definitions of Table 2 for the exemplary embodiment, the bits corresponding to the element values for each violation at the corresponding position(s) may be set to one or zero, depending on the encoder's decision process. The remaining bits which are not known to be zero values are then desirably preserved. However, the positions of these code violations and the encoder's decision process are also known to the decoder in order to decode the codeword ẑ. Table 3 gives a list of possible violations within the left string, and the corresponding bit element values which are desirably preserved.

TABLE 3

| Violation | Zero Bits | Bits to Preserve |
|---|---|---|
| l1 only | a(1), a(2) and a(3) = 0 | a(4), a(5), a(6), a(7), a(8) and a(9) |
| l2 only | a(2), a(3), a(4), a(5), a(6) and a(7) = 0 | a(1), a(8) and a(9) |
| l3 only | a(3), a(4), a(5), a(6), a(7), and a(8) = 0 | a(1), a(2) and a(9) |
| l1, l2 | a(1), a(2), a(3), a(4), a(5), a(6) and a(7) = 0 | a(8) and a(9) |
| l1, l3 | not used (same as l1, l2 and l3 |

TABLE 3-continued

| Violation | Zero Bits | Bits to Preserve |
|---|---|---|
| | case) | |
| 12, 13 | a(2), a(3), a(4), a(5), a(6), a(7), a(8) and a(9) = 0 | a(1) and a(9) |
| 11, 12 and 13 | a(1), a(2), a(3), a(4), a(5), a(6), a(7) and a(8) = 0 | a(9) |

As shown in Table 3, if a(1), a(2) a(8) and a(9) are preserved, the bit preservation requirement for all combinations of left string-only violations is met except when only an 11 violation occurs. Therefore, an exemplary embodiment of the present invention employs two different codewords for $\hat{z}$ each corresponding to a respective one of these two versions of the first case of left string-only violations. The element z(3), which is the pivot bit pb1a, may be employed to distinguish between the two versions. In the exemplary embodiment, setting the pivot bit pb1a to a "1" indicates an 11-only code violation, and setting the pivot bit pb1a to "0" indicates all other left string-only violations. An exemplary codeword $\hat{z}$ is given in Table 4 for a left string-only, 11-only code violation which satisfies the conditions of Table 3, while Table 5 provides the exemplary codeword $\hat{z}$ for all other left string-only violations except the 11-only code violation:

TABLE 4

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(8) | a(9) | 1 | a(4) | a(5) | a(6) | a(7) | 0 | 0 | 1 | a(10) | a(11) | a(12) | a(13) | a(14) | a(15) | a(16) |

TABLE 5

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| 1 | a(1) | 0 | a(2) | a(8) | a(9) | 1 | 0 | 0 | 1 | a(10) | a(11) | a(12) | a(13) | a(14) | a(15) | a(16) |

As shown in Tables 4 and 5, the codeword element z(3)=pb1a=1 corrects the left string-only, 11-only code violation, while z(3)=pb1a=0 and z(1)=z(7)=1 corrects all other left string-only violations.

For the second case of right string-only violations, a table similar to that of Table 3, given below as Table 6, may be constructed, and for this second case the pivot bits pb2 and pb2a are employed and yield the codewords $\hat{z}$ given in Table 7, for the right string-only, r1-only code violation version, and in and Table 8, for all other right string-only violation versions except the r1-only code violation.

TABLE 6

| Violation | Zero Bits | Bits to Preserve |
|---|---|---|
| r1 only | a(14), a(15) and a(16) = 0 | a(8), a(9), a(10), a(11), a(12), and a(13) |
| r2 only | a(10), a(11), a(12), a(13), a(14), and a(15) = 0 | a(8), a(9) and a(16) |
| r3 only | a(9), a(10), a(11), a(12), a(13), and a(14) = 0 | a(8), a(15) and a(16) |
| r1, r2 | a(10), a(11), a(12), a(13), a(14), a(15), and a(16) = 0 | a(8) and a(9) |
| r1, r3 | not used (same as r1, r2 and r3 case) | |
| r2, r3 | a(9), a(10), a(11), a(12), a(13), a(14), and a(15) = 0 | a(8) and a(16) |
| r1, r2 and r3 | a(9), a(10), a(11), a(12), a(13), a(14), a(15) and a(16) = 0 | a(8) |

TABLE 7

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(1) | a(2) | a(3) | a(4) | a(5) | a(6) | a(7) | 1 | 0 | 0 | a(10) | a(11) | a(12) | a(13) | 1 | a(8) | a(9) |

TABLE 8

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(1) | a(2) | a(3) | a(4) | a(5) | a(6) | a(7) | 1 | 0 | 0 | 1 | a(8) | a(9) | a(15) | 0 | a(16) | 1 |

For the third case in which violations occur in both the left string and in the right string, the output codeword $\hat{z}$ may be formed in manner employing the left-only and right-only violation corrections as given in Tables 2–8. Consequently, the codewords $\hat{z}$ for the versions of the remaining third case for the exemplary embodiment of the present invention are as given in Tables 9–12.

Table 9 shows the output codeword ẑ for an l1-only left string violation and an rl-only right string violation, and the pivot bits for this codeword are given as pb=0, pb1=1, pb2=1, pb1a=1 and pb2a=1. Table 10 shows the output codeword ẑ for an r1-only right string code violation and all combinations of left string code violations except the l1-only code violation, and the pivot bits for this codeword are pb=0, pb1=1, pb2=1, pb1a=0 and pb2a=1. Table 11 shows the output codeword ẑ for an l1-only left string violation and all combinations of right string violations except an r1-only code violation, and the pivot bits for this codeword are pb=0, pb1=1, pb2=1, pb1a=1 and pb2a=0. Table 12 shows the output codeword ẑ for all left string violations except an l1-only code violation and all right string violations except an r1-only code, and the pivot bits for this codeword are pb=0, pb1=1, pb2=1, pb1a=0 and pb2a=0.

$$L = l1 \& l2 \& l3 \quad (7)$$

$$LC = !L = !(l1 \& l2 \& l3) \quad (8)$$

$$l1o = (!(l1) \& l2 \& l3) = L1X \quad (9)$$

$$l1oc = !l1o = L1XC \quad (10)$$

$$R = r1 \& r2 \& r3 \quad (11)$$

$$RC = !R = !(r1 \& r2 \& r3) \quad (12)$$

$$r1o = (!(r1) \& r2 \& r3) = R1X \quad (13)$$

$$r1oc = !r1o = R1XC \quad (14)$$

Once the pre-encoder set of equations is defined, the bit values for the output codeword elements $z(1), z(2) \ldots z(17)$ may be given for the exemplary embodiment as set forth in equations 15–31:

$$z(1) = (a(1) \& L) + (LC \& ((a(8) \& l1o) + (1 \& l1oc))) \quad (15)$$

TABLE 9

| z(1) | z(2) | z(3) | z(4) | z(5) | z(6) | z(7) | z(8) | z(9) | z(10) | z(12) | z(13) | z(14) | z(15) | z(16) | z(17) | z(18) |
|---|---|---|---|---|---|---|---|---|---|---|---|---|---|---|---|---|
| a(8) | a(9) | 1 | a(4) | a(5) | a(6) | a(7) | 1 | 0 | 1 | a(10) | a(11) | a(12) | a(13) | 1 | a(8) | a(9) |

TABLE 10

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| 1 | a(1) | 0 | a(2) | a(8) | a(9) | 1 | 1 | 0 | 1 | a(10) | a(11) | a(12) | a(13) | 1 | a(8) | a(9) |

TABLE 11

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(8) | a(9) | 1 | a(4) | a(5) | a(6) | a(7) | 1 | 0 | 1 | 1 | a(8) | a(9) | a(15) | 0 | a(16) | 1 |

TABLE 12

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| 1 | a(1) | 0 | a(2) | a(8) | a(9) | 1 | 1 | 0 | 1 | 1 | a(8) | a(9) | a(15) | 0 | a(16) | 1 |

The first and second classifications and identified code violations, such as those given in the exemplary embodiment as expressed in Tables 2–12, may be expressed using boolean equations that express the bit values of the encoder output codeword ẑ as a function of the bit values of the input dataword â. For the following equations, a "&" expression indicates a logical AND operation, a "+" expression indicates a logical OR operation, and a "!" expression indicates a logical complement.

First, a pre-encoder set of equations of the exemplary embodiment of the present invention is defined by equations (1) through (14):

$$l1 = (a(1) + a(2) + a(3)) = L1 \quad (1)$$

$$l2 = (a(2) + a(3) + a(4) + a(5) + a(6) + a(7)) = L2 \quad (2)$$

$$l3 = (a(3) + a(4) + a(5) + a(6) + a(7) + a(8)) = L3 \quad (3)$$

$$r1 = (a(14) + a(15) + a(16)) = R1 \quad (4)$$

$$r2 = (a(10) + a(11) + a(12) + a(13) + a(14) + a(15)) = R2 \quad (5)$$

$$r3 = (a(9) + a(10) + a(11) + a(12) + a(13) + a(14)) = R3 \quad (6)$$

$$z(2) = (a(2) \& L) + (LC \& ((a(9) \& l1o) + (a(1) \& l1oc))) \quad (16)$$

$$z(3) = (a(3) \& L) + (LC \& ((1 \& l1o) + (0 \& l1oc))) \quad (17)$$

$$z(4) = (a(4) \& L) + (LC \& ((a(4) \& l1o) + (a(2) \& l1oc))) \quad (18)$$

$$z(5) = (a(5) \& L) + (LC \& ((a(5) \& l1o) + (a(8) \& l1oc))) \quad (19)$$

$$z(6) = (a(6) \& L) + (LC \& ((a(6) \& l1o) + (a(9) \& l1oc))) \quad (20)$$

$$z(7) = (a(7) \& L) + (LC \& ((a(7) \& l1o) + (1 \& l1oc))) \quad (21)$$

$$z(8) = (R \& ((a(8) \& L) + (0 \& LC))) + (1 \& RC) \quad (22)$$

$$z(9) = (1 \& L \& R) + (0 \& (!(L \& R))) \quad (23)$$

$$z(10) = (L \& (a(9) \& R) + (0 \& RC)) + (LC \& 1) \quad (24)$$

$$z(11) = (a(10) \& R) + (RC \& ((a(10) \& r1o) + (1 \& r1oc))) \quad (25)$$

$$z(12) = (a(11) \& R) + (RC \& ((a(11) \& r1o) + (a(8) \& r1oc))) \quad (26)$$

$$z(13) = (a(12) \& R) + (RC \& ((a(12) \& r1o) + (a(9) \& r1oc))) \quad (27)$$

$$z(14) = (a(13) \& R) + (RC \& ((a(13) \& r1o) + (a(15) \& r1oc))) \quad (28)$$

$$z(15)=(a(14)\&R)+(RC\&((1\&r1o)+(0\&r1oc))) \quad (29)$$

$$z(16)=(a(15)\&R)+(RC\&((a(8)\&r1o)+(a(16)\&r1oc))) \quad (30)$$

$$z(17)=(a(16)\&R)+(RC\&((a(9)\&r1o)+(1\&r1oc))) \quad (31)$$

The logical operations of the set of encoder equations may be minimized further by factoring common terms of equations (15) through (31); consequently, terms may be pre-calculated and pre-encoded to determine further operations on input bits. Using the following factors given in equations (32) through (39):

$$OZ1=(a(8)\&L1X)+(L1XC) \quad (32)$$

$$OZ2=(a(9)\&L1X)+(a(1)\&L1XC)) \quad (33)$$

$$OZ4A=(LC\&L1X)+L \quad (34)$$

$$OZ4B=(!(L+L1X) \quad (35)$$

$$OZ17=(a(9)\&R1X)+(R1XC) \quad (36)$$

$$OZ16=(a(8)\&R1X)+(a(16)\&R1XC)) \quad (37)$$

$$OZ14A=(RC\&R1X)+R \quad (38)$$

$$OZ14B=(!(R+R1X) \quad (39)$$

the encoder equations for the elements of codeword 2 are given as equations (15') through (31'):

$$z(1)=(a(1)\&L)+(OZ1\&LC) \quad (15')$$

$$z(2)=(a(2)\&L)+(OZ2\&LC) \quad (16')$$

$$z(3)=(a(3)\&OZ4A)+(L1X\&LC) \quad (17')$$

$$z(4)=(a(4)\&OZ4A)+(a(2)\&OZ4B) \quad (18')$$

$$z(5)=(a(5)\&OZ4A)+(a(8)\&OZ4B) \quad (19')$$

$$z(6)=(a(6)\&OZ4A)+(a(9)\&OZ4B) \quad (20')$$

$$z(7)=(a(7)\&OZ4A)+(OZ4B) \quad (21')$$

$$z(8)=(a(8)\&z(9))+RC \quad (22')$$

$$z(9)=!(RC+LC) \quad (23')$$

$$z(10)=(a(9)\&z(9))+(LC) \quad (24')$$

$$z(11)=(a(10)\&OZ14A)+(OZ14B) \quad (25')$$

$$z(12)=(a(11)\&OZ14A)+(a(8)\&OZ14B) \quad (26')$$

$$z(13)=(a(12)\&OZ14A)+(a(9)\&OZ14B) \quad (27')$$

$$z(14)=(a(13)\&OZ14A)+(a(15)\&OZ14B) \quad (28')$$

$$z(15)=(a(14)\&OZ14A)+(R1X\&RC) \quad (29')$$

$$z(16)=(a(15)\&R)+(OZ16\&RC) \quad (30')$$

$$z(17)=(a(16)\&R)+(OZ17\&RC) \quad (31')$$

Figure 5:
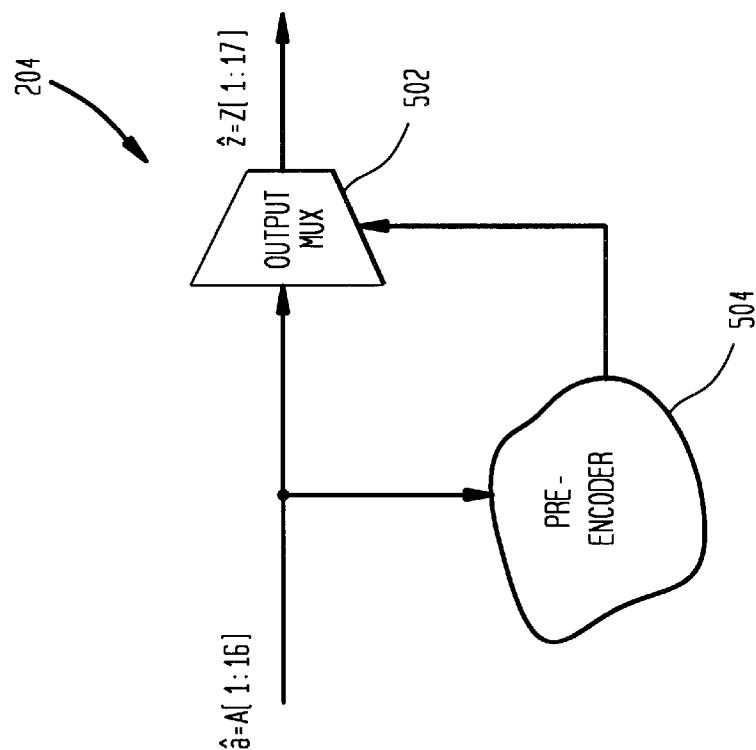
FIG. 5 is a block diagram of a 16/17 (0,5) block encoder as shown in FIG. 2 having a minimized encoding equation set in accordance with an exemplary embodiment of the present invention.

FIG. 5 is a block diagram of a 16/17 block encoder as shown in FIG. 2 of an exemplary embodiment having a minimized encoding equation set in accordance with the present invention. The input codeword $\hat{a}$ is provided to both an output mux 502 and a pre-encoder 504. Pre-encoder 504 provides intermediate variable values corresponding to the intermediate variables given in equations (1) through (14) and (32) through (39), which equations are derived from the code violations as described previously. Using the intermediate variable values, output mux 502 provides the output codeword bits z(1), z(2), . . . z(17) in accordance with the minimized set of encoder equations (15') through (31'), respectively.

Figure 7A:
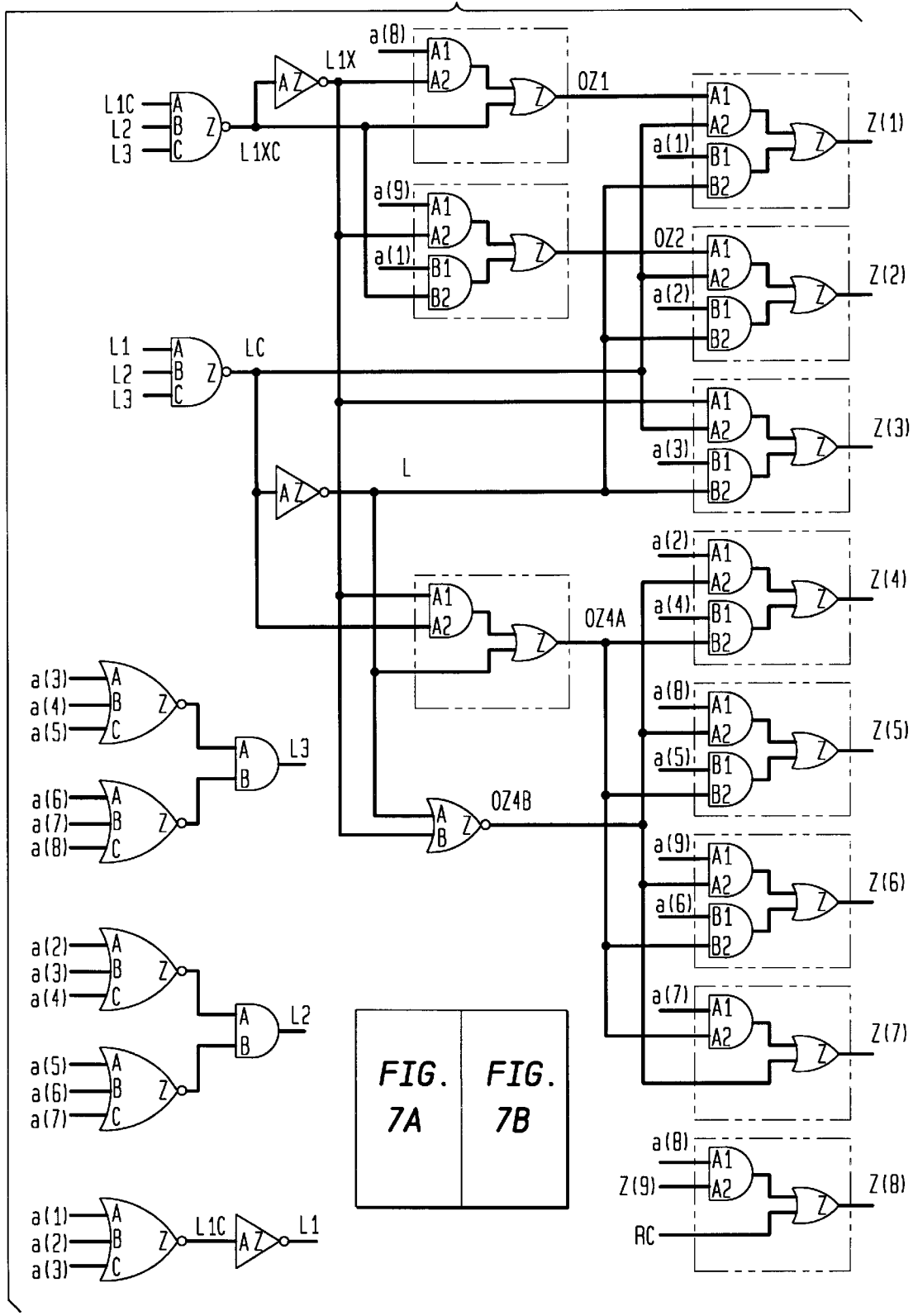
FIG. 7A is a first half of a 16/17 (0,5) block encoder circuit implementing a minimized encoding equation set in accordance with an exemplary embodiment of the present invention.
Figure 7B:
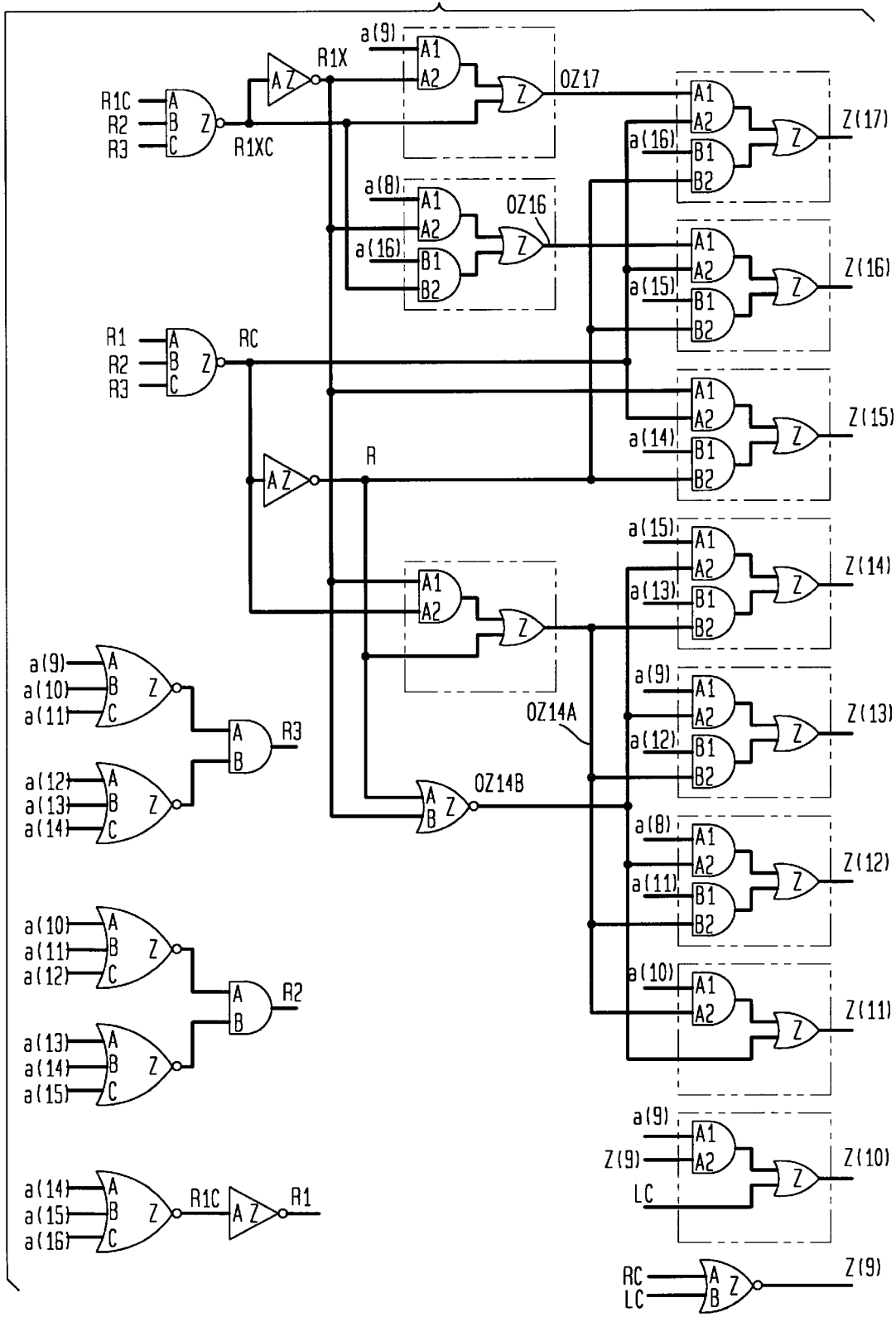
FIG. 7B is a second half of a 16/17 (0,5) block encoder circuit implementing a minimized encoding equation set in accordance with an exemplary embodiment of the present invention.

FIGS. 7A and 7B are first and second halves, respectively, of a modulation encoder circuit encoding a rate 16/17 (0,5) code with a minimized encoding equation set as given by equations (15') through (31') in accordance with the exemplary embodiment of the present invention.

Block Decoding

The unprecoder 114 of the exemplary system 100 of FIG. 1 reverses the precoding operation of the precoder 106, and provides output codewords to the modulation decoder 116. The modulation decoder 116 decodes the symbol sequence in accordance with the 16/17 (0,5) code construction of the present invention to provide a sequence of datawords.

FIG. 3 is a block diagram showing the modulation decoder 116 of FIG. 1 in accordance with an exemplary embodiment of the present invention. The modulation decoder includes a serial to parallel converter 302, 16/17 block decoder 304 and parallel shift register 306. Codewords are provided as a serial symbol stream and are converted to a parallel bit stream by serial to parallel converter 302 in accordance with a symbol clock signal. 16/17 block decoder 304 constructs an output dataword $\hat{d}$ based on the input 16/17 (0,5) codeword $\hat{z}$. The 16/17 block decoder 304 provides these datawords $\hat{d}$ of 16 bits to the shift register 306. Datawords of 16 bits in parallel are then sequentially provided by shift register 306 in accordance with a word clock signal. In a similar manner as described with respect to the modulation encoder 104, a codeword is converted to a corresponding dataword while the next codeword is received in the serial to parallel converter 302.

Decoder Equations

The modulation decoder examines various defined pivot bits of the input codeword $\hat{z}=z(1), z(2), \ldots z(17)$ before providing a reformatted codeword having 16 elements using the 17 elements z(1), z(2), . . . z(17) of $\hat{z}$. As discussed previously with respect to the code construction, the input codeword $\hat{z}$ is formed based on the absence or detected presence of one or more predefined code violations within the original dataword $\hat{a}$. Consequently, the modulation decoder in accordance with the exemplary embodiment of the present invention interprets the values of the pivot bits to re-constitute the bit values for elements causing the code violations defined by the pivot bits, thereby providing 16-bit words $\hat{d}$ having element values as given in the following Tables 13–21.

Table 13 gives the word $\hat{d}$ for the case of pb=1, in which no code violations are present in the original dataword $\hat{a}$.

TABLE 13

| z(1) | z(2) | z(3) | z(4) | z(5) | z(6) | z(7) | z(8) | z(10) | z(11) | z(12) | z(13) | z(14) | z(15) | z(16) | z(17) |
|------|------|------|------|------|------|------|------|-------|-------|-------|-------|-------|-------|-------|-------|

Table 14 gives the word $\hat{d}$ for the case of pb=0, pb1=0, pb2=1, and pb1a=1 in which no code violations occur in the right string of the original dataword $\hat{a}$, but an 11-only code violation occurs in the left string.

TABLE 14

| 0 | 0 | 0 | $z(4)$ | $z(5)$ | $z(6)$ | $z(7)$ | $z(1)$ | $z(2)$ | $z(11)$ | $z(12)$ | $z(13)$ | $z(14)$ | $z(15)$ | $z(16)$ | $z(17)$ |
|---|---|---|---|---|---|---|---|---|---|---|---|---|---|---|---|

Table 15 gives the word $\hat{d}$ for the case of pb=0, pb1=0, pb2=1, and pb1a=0 in which no code violations occur in the right string of the original dataword â, but any code violation other than an l1-only violation occurs in the left string.

TABLE 15

| $z(2)$ | $z(4)$ | 0 | 0 | 0 | 0 | 0 | $z(5)$ | $z(6)$ | $z(11)$ | $z(12)$ | $z(13)$ | $z(14)$ | $z(15)$ | $z(16)$ | $z(17)$ |
|---|---|---|---|---|---|---|---|---|---|---|---|---|---|---|---|

Table 16 gives the word $\hat{d}$ for the case of pb=0, pb1=1, pb2=0, and pb2a=1 in which no code violations occur in the left string of the original dataword â, but an r1-only code violation occurs in the right string.

TABLE 16

| $z(1)$ | $z(2)$ | $z(3)$ | $z(4)$ | $z(5)$ | $z(6)$ | $z(7)$ | $z(16)$ | $z(17)$ | $z(11)$ | $z(12)$ | $z(13)$ | $z(14)$ | 0 | 0 | 0 |
|---|---|---|---|---|---|---|---|---|---|---|---|---|---|---|---|

Table 17 gives the word $\hat{d}$ for the case of pb=0, pb1=1, pb2=0, and pb2a=0 in which no code violations occur in the left string of the original dataword â, but any violation other than an r1-only code violation occurs in the right string.

TABLE 17

| $z(1)$ | $z(2)$ | $z(3)$ | $z(4)$ | $z(5)$ | $z(6)$ | $z(7)$ | $z(12)$ | $z(13)$ | 0 | 0 | 0 | 0 | 0 | $z(14)$ | $z(16)$ |
|---|---|---|---|---|---|---|---|---|---|---|---|---|---|---|---|

Table 18 gives the word $\hat{d}$ for the case of pb=0, pb1=1, pb2=1, pb1a=1, and pb2a=1, in which an l1-only code violation occurs in the left string of the original dataword â, and an r1-only code violation occurs in the right string.

TABLE 18

| 0 | 0 | 0 | $z(4)$ | $z(5)$ | $z(6)$ | $z(7)$ | $z(1)$ | $z(17)$ | $z(11)$ | $z(12)$ | $z(13)$ | $z(14)$ | 0 | 0 | 0 |
|---|---|---|---|---|---|---|---|---|---|---|---|---|---|---|---|

Table 19 gives the word $\hat{d}$ for the case of pb=0, pb1=1, pb2=1, pb1a=0, and pb2a=0, in which any combination of code violations occur in the left and right strings of the original dataword â except an l1-only and an r1-only code violation.

TABLE 19

| $z(2)$ | $z(4)$ | 0 | 0 | 0 | 0 | 0 | $z(5)$ | $z(13)$ | 0 | 0 | 0 | 0 | 0 | $z(14)$ | $z(16)$ |
|---|---|---|---|---|---|---|---|---|---|---|---|---|---|---|---|

Table 20 gives the word $\hat{d}$ for the case of pb=0, pb1=1, pb2=1, pb1a=0, and pb2a=1, in which any combination of left string code violations occur except an l1-only code violation, and an r1 only code violation occurs in the right string.

TABLE 20

| z(2) | z(4) | 0 | 0 | 0 | 0 | 0 | z(5) | z(17) | z(11) | z(12) | z(13) | z(14) | 0 | 0 | 0 |
|---|---|---|---|---|---|---|---|---|---|---|---|---|---|---|---|

Table 21 gives the word $\hat{d}$ for the case of pb=0, pb1=1, pb2=1, pb1a=1, and pb2a=0, in which an 11 only code violation occurs in the left string of the original dataword $\hat{a}$, and any combinations of code violations except the r1-only code violation occurs in the right string.

TABLE 21

| 0 | 0 | 0 | z(4) | z(5) | z(6) | z(7) | z(1) | z(13) | 0 | 0 | 0 | 0 | 0 | z(14) | z(16) |
|---|---|---|---|---|---|---|---|---|---|---|---|---|---|---|---|

To provide decoded 16 bit words as given in Tables 13–21, boolean equations may be formed to express the relationship between the input element values of $\hat{z}$ with the output element values of the decoded dataword $\hat{d}$. First, the various pivot bits are defined as pb1a=z(3), pb1=z(8), pb=z(9), pb2=z(10) and pb2a=z(15). For the following equations (40) through (81), a "&" expression indicates a logical AND operation, a "+" expression indicates a logical OR operation, and a "!" expression indicates a logical complement. Defining a pre-decoder set of equations (40) through (43) as:

$$t1=(!pb1\&pb2)+(pb1\&pb2) \tag{40}$$

$$t1a=(pb1\&!pb2) \tag{41}$$

$$t2=(pb1\&!pb2)+(pb1\&pb2) \tag{42}$$

$$t2a=(!pb1\&pb2) \tag{43}$$

Then the decoded output bits d(1), d(2), . . . d(16) of $\hat{d}$ are given by equations (44) through (59):

$$d(1)=(z(1)\&pb)+((!pb)\&(((0\&pb1a)+(z(2)\&(!pb1a))\&(t1))+(z(1)\&t1a))) \tag{44}$$

$$d(2)=(z(2)\&pb)+((!pb)\&(((0\&pb1a)+(z(4)\&(!pb1a))\&(t1))+(z(2)\&t1a))) \tag{45}$$

$$d(3)=(z(3)\&pb)+((!pb)\&((pb1\&(!pb2)\&z(3))+0)) \tag{46}$$

$$d(4)=(z(4)\&pb)+((!pb)\&(((z(4)\&pb1a)+(0\&(!pb1a))\&(t1))+(z(4)\&t1a))) \tag{47}$$

$$d(5)=(z(5)\&pb)+((!pb)\&(((z(5)\&pb1a)+(0\&(!pb1a))\&(t1))+(z(5)\&t1a))) \tag{48}$$

$$d(6)=(z(6)\&pb)+((!pb)\&(((z(6)\&pb1a)+(0\&(!pb1a))\&(t1))+(z(6)\&t1a))) \tag{49}$$

$$d(7)=(z(7)\&pb)+((!pb)\&(((z(7)\&pb1a)+(0\&(!pb1a))\&(t1))+(z(7)\&t1a))) \tag{50}$$

$$d(8)=(z(8)\&pb)+((!pb)\&(((z(1)\&pb1a)+(z(5)\&(!pb1a))\&(t1))+(((pb2a\&z(16))+((!pb2a)\&z(12)))\&t1a)) \tag{51}$$

$$d(9)=(z(10)\&pb)+((!pb)\&(((z(2)\&pb1a)+(z(6)\&(!pb1a))\&(t2a))+(((pb2a\&z(17))+((!pb2a)\&z(13)))\&t2))) \tag{52}$$

$$d(10)=(z(11)\&pb)+((!pb)\&(((z(11)\&pb2a)+(0\&(!pb2a))\&(t2))+(z(11)\&t2a))) \tag{53}$$

$$d(11)=(z(12)\&pb)+((!pb)\&(((z(12)\&pb2a)+(0\&(!pb2a))\&(t2))+(z(12)\&t2a))) \tag{54}$$

$$d(12)=(z(13)\&pb)+((!pb)\&(((z(13)\&pb2a)+(0\&(!pb2a))\&(t2))+(z(13)\&t2a))) \tag{55}$$

$$d(13)=(z(14)\&pb)+((!pb)\&(((z(14)\&pb2a)+(0\&(!pb2a))\&(t2))+(z(14)\&t2a))) \tag{56}$$

$$d(14)=(z(15)\&pb)+((!pb)\&((((!pb1)\&pb2)\&z(15))+0)) \tag{57}$$

$$d(15)=(z(16)\&pb)+((!pb)\&(((0\&pb2a)+(z(14)\&(!pb2a))\&(t2))+(z(16)\&t2a))) \tag{58}$$

$$d(16)=(z(17)\&pb)+((!pb)\&(((0\&pb2a)+(z(16)\&(!pb2a))\&(t2))+(z(17)\&t2a))) \tag{59}$$

The logical operations of the set of decoder equations may be minimized further by factoring common terms of equations (44) through (59); consequently, terms may be pre-calculated and pre-decoded to determine further operations on input bits of the codewords $\hat{d}$. Using the following factors given in equations (60) through (81):

$$AC=!(z(3)) \tag{60}$$

$$BC=!(z(8)) \tag{61}$$

$$CC=!(z(9)) \tag{63}$$

$$DC=!(z(10)) \tag{64}$$

$$EC=!(z(15)) \tag{65}$$

$$T1=(z(8)\&z(10))+(T2A) \tag{66}$$

$$T1A=!(z(10)+BC) \tag{67}$$

$$T1B=(z(3)\&T1)+(T1A) \tag{68}$$

$$T1C=(T1B\&CC)+(z(9)) \tag{69}$$

$$T2=(z(8)\&z(10))+(T1A) \tag{70}$$

$$T2A=!(z(8)+DC) \tag{71}$$

$$T2B=(z(15)\&T2)+(T2A) \tag{72}$$

$$T2C=(T2B\&CC)+(z(9)) \tag{73}$$

$$IZ1=(AC\&CC\&T1) \tag{74}$$

$$IZ2=(z(9)+T1A) \tag{75}$$

$$IZ3=(z(8)\&CC\&DC)+(z(9)) \tag{76}$$

$$IZ8=((T1\&((z(1)\&z(3))+((z(5)\&AC))+((T1A((z(15)\&z(16))+(z(12)\&EC))) \tag{77}$$

$$IZ9=((T1\&((z(2)\&z(3))+((z(6)\&AC))+((T1A((z(15)\&z(17))+(z(13)\&EC))) \tag{78}$$

$$IZ14=(z(10)\&CC\&BC)+(z(9)) \tag{79}$$

$$IZ15=(z(9)+T2A) \tag{80}$$

$$IZ16=EC\&CC\&T2 \tag{81}$$

the minimized decoder equations (44') through (59') are as given below.

$$d(1)=(z(1)\&IZ2)+(z(2)\&IZ1) \tag{44'}$$

$d(2) = (z(2) \& IZ2) + (z(4) \& IZ1)$ (45')

$d(3) = (z(3) \& IZ3)$ (46')

$d(4) = (z(4) \& T1C)$ (47')

$d(5) = (z(5) \& T1C)$ (48')

$d(6) = (z(6) \& T1C)$ (49')

$d(7) = (z(7) \& T1C)$ (50')

$d(8) = (z(8) \& z(9)) \& (CC \& IZ8)$ (51')

$d(9) = (z(10) \& z(9)) \& (CC \& IZ9)$ (52')

$d(10) = (z(11) \& T2C)$ (53')

$d(11) = (z(12) \& T2C)$ (54')

$d(12) = (z(13) \& T2C)$ (55')

$d(13) = (z(14) \& T2C)$ (56')

$d(14) = (z(15) \& IZ14)$ (57')

$d(15) = (z(16) \& IZ15) + (z(14) \& IZ16)$ (58')

$d(16) = (z(17) \& IZ15) + (z(16) \& IZ16)$ (59')

Figure 6:
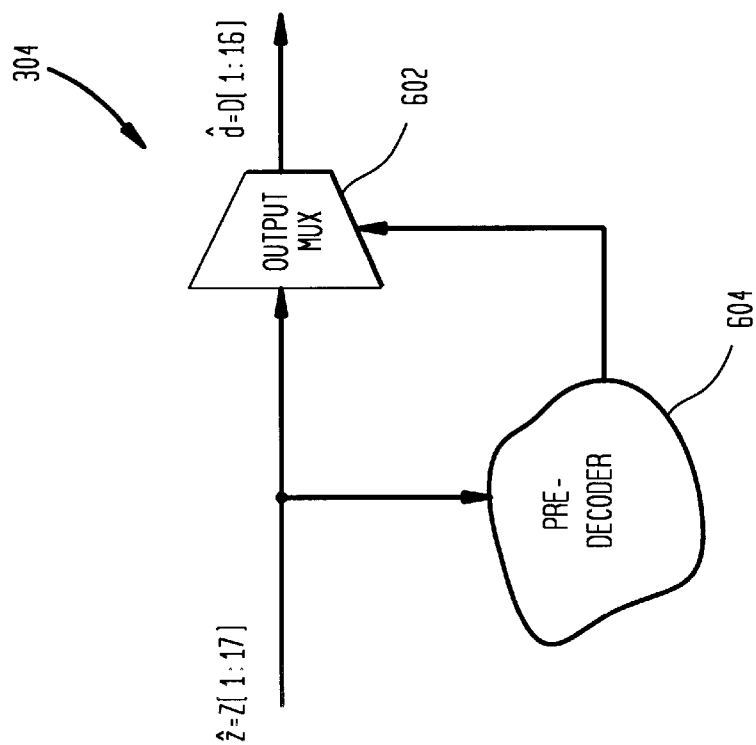
FIG. 6 is a block diagram of a 16/17 (0,5) block decoder as shown in FIG. 3 having a minimized decoding equation set in accordance with an exemplary embodiment of the present invention.

FIG. 6 is a block diagram of a 16/17 block decoder 304 as shown in FIG. 3 of an exemplary embodiment having a minimized decoding equation set in accordance with the present invention. The input codeword $\hat{z} = z(1), z(2), \ldots z(17)$ is provided to both an output mux 602 and a pre-decoder 604. Pre-decoder 604 provides intermediate variable values corresponding to the intermediate variables given in equations (40) through (43) and (60) through (81) described subsequently, and which are derived from the constructed 16/17 (0,5) codewords which construction is as described previously. Using the intermediate variable values, output mux 602 provides the output received dataword bits d(1), d(2), ... d(16) in accordance with equations (44) through (59), or (44') through (59'), respectively.

Figure 8A:
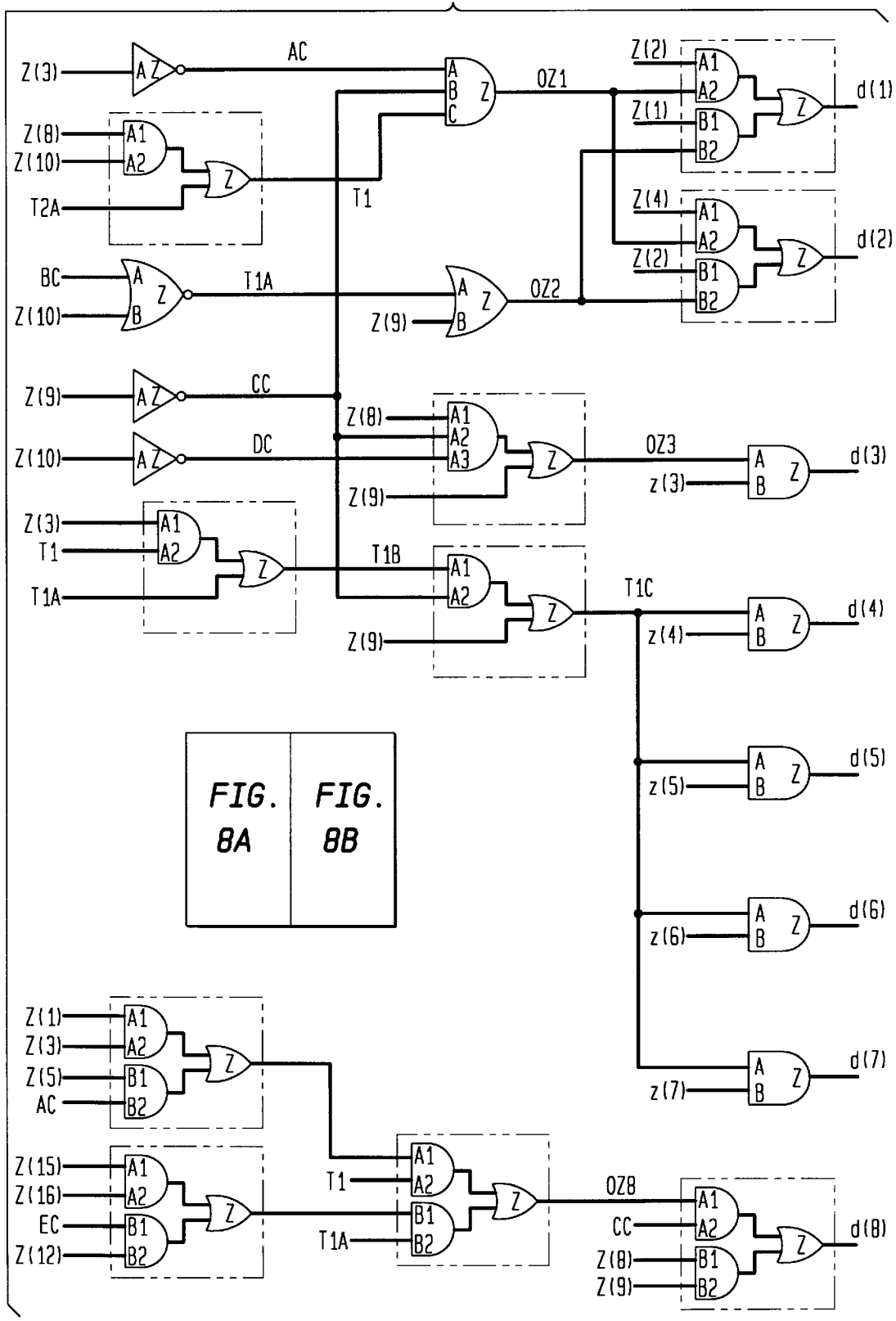
FIG. 8A is a first half of a 16/17 (0,5) block decoder circuit implementing a minimized decoding equation set in accordance with an exemplary embodiment of the present invention; and, FIG. 8B is a second half of a 16/17 (0,5) block decoder circuit implementing a minimized decoding equation set in accordance with an exemplary embodiment of the present invention.
Figure 8B:
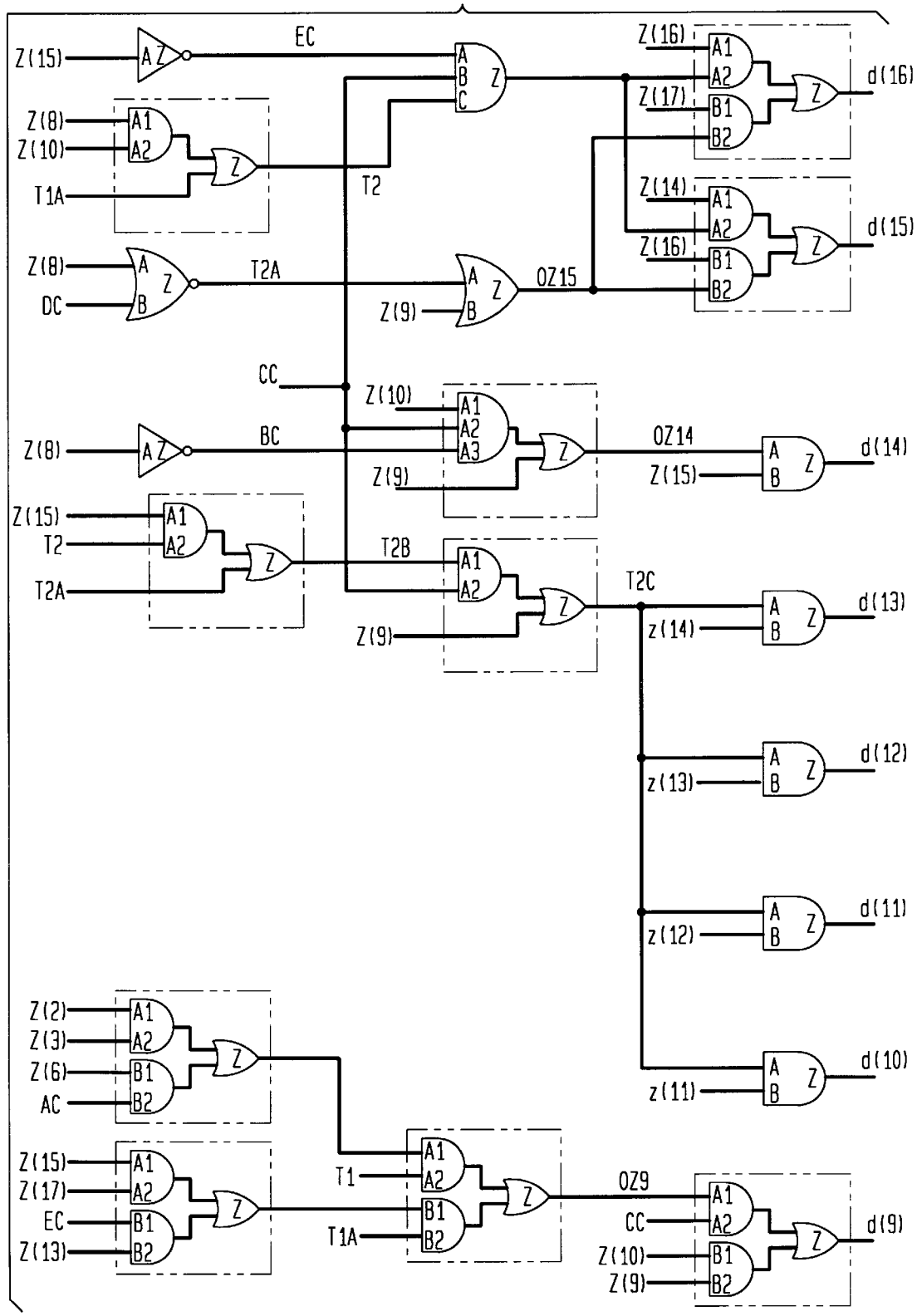

FIGS. 8A and 8B are first and second halves of a modulation decoder circuit decoding a rate 16/17 (0,5) code with the minimized decoding equations (44') through (59') in accordance with the exemplary embodiment of the present invention.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. Apparatus for providing a codeword from a dataword of binary data for encoding of the binary data on a magnetic media, the apparatus comprising:

a storage circuit, coupled to an input stream to receive the dataword, which stores the dataword as first and second bit strings;

a processor, coupled to the storage circuit, which determines whether each of the first and second bit strings contains at least one code violation, each code violation corresponding to a given bit sequence, the processor identifying a type and a position of the code violation; and an encoder circuit, coupled to an input stream to receive the dataword, which inserts a pivot bit between the first and second strings and encodes the dataword into the codeword, wherein the encoder circuit encodes by correcting, as necessary, any code violation in the first and second bit strings by 1) setting the inserted pivot bit to a first value, 2) defining values for one or more bits in each of the first and second bit strings as additional pivot bits, the additional pivot bits identifying the type and the position of the code violation, 3) preserving values for bits not included in the given bit sequence corresponding to the code violation, and 4) assigning values, as necessary, for one or more bits of the given bit sequence.

2. The apparatus for providing the codeword from the dataword as recited in claim 1, wherein, when the processor determines no code violation exists, the encoder circuit sets the inserted pivot bit to a second value and provides the codeword as the first and second bit strings and the inserted pivot bit therebetween set to the second value.

3. The apparatus for providing the codeword from the dataword as recited in claim 2, wherein:

the storage circuit is a shift register, the shift register coupled to the input bit stream to provide the dataword in a accordance with a word clock signal;

the processor is a pre-encoding processor which provides a set of logic combination signals based on predetermined bits of the dataword corresponding to a code violation; and the encoder circuit being a multiplexer having a set of selection circuits, the multiplexer coupled to the shift register and each of the set of selection circuits coupled to receive respective bits of the dataword and respective ones of the set of logic combination signals, wherein the set of selection circuits preserves values and assigns values of the bits of the dataword, as necessary, in response to the set of logic combination signals.

4. The apparatus for providing the codeword from the dataword as recited in claim 3, wherein the dataword corresponds to a sequence of M bits of binary data and the codeword includes N symbols, M and N are integers and N is greater than M, and the storage circuit is a parallel shift register and the apparatus further includes a parallel to serial shift register, the encoder circuit providing the codeword to the parallel to serial shift register, and the parallel to serial shift register converts the codeword to a serial bit stream in accordance with a symbol clock, a period of the word clock equivalent to N periods of the symbol clock.

5. The apparatus for providing the codeword from the dataword as recited in claim 2, wherein:

the dataword corresponds to a sequence of M bits of binary data and the codeword includes N symbols, M and N are integers and N is greater than M, and each code violation is one of a set of code violations, the set of code violations including an end code violation having the given bit sequence corresponding to a first number of consecutive bit values occurring at one end of one of the first and second bits strings, the one end not adjacent to the inserted pivot bit, and the set of code violations including at least one other code violation having the given bit sequence corresponding to a second number of consecutive bit values within one of the first and the second bit strings.

6. The apparatus for providing the codeword from the dataword as recited in claim 5, wherein a ratio of M/N is 16/17, the first number of consecutive bit values of the end code violation corresponds to three consecutive zero values, and the predetermined number of consecutive bit values of each other code violation corresponds to six consecutive zero values, thereby to form the codeword of a 16/17 (0,5) block code.

7. The apparatus for providing the codeword from the dataword as recited in claim 1, wherein the apparatus is included in a modulation encoder of a partial response magnetic recording system having a modulation precoder and a magnetic recording head, the codeword is provided to the modulation precoder which precodes the codeword, and the modulation precoded codeword is recorded on the magnetic media by the magnetic recording head.

8. The apparatus for providing the codeword from the dataword as recited in claim 1, wherein the modulation precoder of the partial response magnetic recording system is a $1/(1)1\oplus D^2)$ precoder.

9. Apparatus for decoding a codeword to provide a dataword representing binary data, the apparatus comprising:

a storage circuit, coupled to an input stream to receive the codeword, which stores the codeword as N symbols;

a processor, coupled to the storage circuit, which provides a set of pivot bits and preserved bits from the N symbols of the codeword and determines, from the set of pivot bits, whether the dataword includes a code violation, the set of pivot bits identifying a type and position of any code violation in the dataword, each code violation corresponding to a given bit sequence within the dataword; and a decoder circuit which forms the dataword from the preserved bits and the given bit sequence of each code violation in accordance with the set of pivot bits, wherein the decoder circuit decodes by reconstructing, as necessary, any code violation in the dataword as the given bit sequence having the type and at the position as defined by the set of pivot bits, and by assigning the preserved bits to respective locations in the dataword in accordance with the set of pivot bits.

10. The apparatus for decoding a codeword to provide a dataword representing binary data as recited in claim 9, wherein:

the processor is a pre-decoding processor which provides a set of logic combination signals based on selected ones of the N symbols of the codeword; and the decoder circuit is a multiplexer having a set of selection circuits, each of the set of selection circuits coupled to receive respective symbols of the dataword and respective ones of the set of logic combination signals, wherein the set of selection circuits preserves values and assigns values of the symbols of the codeword, as necessary, in response to the set of logic combination signals to form the dataword.

11. The apparatus for decoding the codeword to provide the dataword as recited in claim 10, wherein the apparatus is included in a modulation decoder of a partial response magnetic recording system having a magnetic read head and a modulation un-precoder, the codeword being precoded and recorded on the magnetic media, the precoded codeword being read from the magnetic media by the magnetic read head and provided to the modulation un-precoder which un-precodes and provides the codeword to the decoder circuit.

12. A method of encoding a dataword as a codeword, the dataword corresponding to a sequence of M bits of binary data and the codeword having N symbols, M and N are integers and N is greater than M, the method comprising the steps of:

(a) dividing the dataword into first and second bit strings and inserting a pivot bit therebetween;

(b) determining whether each of the first and second bit strings contains at least one code violation, each code violation corresponding to a given bit sequence; and (c) correcting, as necessary, any code violation in the first and second bit strings by:

(c1) defining values for one or more bits in each of the first and second bit strings as additional pivot bits, the additional pivot bits identifying a type and a position of the code violation;

(c2) preserving values for bits not included in the given bit sequence corresponding to the code violation; and (c3) assigning values, as necessary, for one or more bits of the given bit sequence.

13. The method of encoding as recited in claim 12, further comprising the steps of:

(d) setting the inserted pivot bit to a first value when at least one of the first and second strings contains a code violation; and (e) setting the inserted pivot bit to a second value if no code violation exists in the first and second bit strings, the codeword formed by the first and second bit strings and the inserted pivot bit set to the second value therebetween.

14. The method of encoding as recited in claim 12, wherein each code violation is one of a set of code violations, the set of code violations including an end code violation having the given bit sequence corresponding to a first number of consecutive bit values occurring at one end of one of the first and second bits strings, the one end not adjacent to the inserted pivot bit, and the set of code violations including at least one other code violation having the given bit sequence corresponding to a second number of consecutive bit values within one of the first and the second bit strings.

15. The method of encoding as recited in claim 14, wherein a ratio of M/N is 16/17, the first number of consecutive bit values of the end code violation corresponds to three consecutive zero values, and the predetermined number of consecutive bit values of each other code violation corresponds to six consecutive zero values, thereby to form the codeword of a 16/17 (0,5) block code.

16. A method of decoding a codeword to provide a dataword, the dataword corresponding to a sequence of M bits of binary data and the codeword having N symbols, M and N are integer and N is greater than M, the method comprising the steps of:

a) providing a set of pivot bits and a set of preserved bits from the N symbols of the codeword;

b) determining, from the set of pivot bits, whether the dataword includes a code violation, the set of pivot bits identifying a type and position of any code violation, each code violation corresponding to a given bit sequence within the sequence of M bits; and c) forming the dataword from the preserved bits and the given bit sequence of each code violation in accordance with the set of pivot bits.

17. The method of decoding as recited in claim 16, wherein the codeword is formed by the steps of:

(a) dividing the dataword into first and second bit strings and inserting a pivot bit therebetween;

(b) determining whether each of the first and second bit strings contains at least one code violation, each code violation corresponding to a given bit sequence; and (c) correcting, as necessary, any code violation in the first and second bit strings by:

(c1) defining values for one or more bits in each of the first and second bit strings as additional pivot bits, the additional pivot bits identifying a type and a position of the code violation and the additional pivot bits and the inserted pivot bit forming the set of pivot bits;

(c2) preserving values for bits not included in the given bit sequence corresponding to the code violation; and (c3) assigning values, as necessary, for one or more bits of the given bit sequence.

18. An integrated circuit including an encoding apparatus for providing a codeword from a dataword of binary data for encoding of the binary data on a magnetic media, comprising:

memory means, coupled to an input stream for storing the dataword as first and second bit strings;

processing means, coupled to the storage circuit, for determining whether each of the first and second bit strings contains at least one code violation, each code violation corresponding to a given bit sequence, the processing means identifying a type and a position of the code violation;

encoding means, coupled to an input stream to receive the dataword, for encoding the dataword into the codeword, the encoding means inserting a pivot bit between the first and second strings, wherein the encoding means encodes by correcting, as necessary, any code violation in the first and second bit strings by 1) setting the inserted pivot bit to a first value, 2) defining values for one or more bits in each of the first and second bit strings as additional pivot bits, the additional pivot bits identifying the type and the position of the code violation, 3) preserving values for bits not included in the given bit sequence corresponding to the code violation, and 4) assigning values, as necessary, for one or more bits of the given bit sequence.

19. The encoding apparatus for providing the codeword from the dataword as recited in claim 18, wherein, when the processing means determines no code violation exists, the encoding means sets the inserted pivot bit to a second value and provides the codeword as the first and second bit strings and the inserted pivot bit therebetween set to the second value.

20. An integrated circuit including a decoding apparatus for decoding a codeword to provide a dataword representing binary data, the apparatus comprising:

storage means, coupled to an input stream to receive the codeword, for storing the codeword as N symbols;

processing means, coupled to the storage circuit, for providing a set of pivot bits and preserved bits from the N symbols of the codeword and determining, from the set of pivot bits, whether the dataword includes a code violation, the set of pivot bits identifying a type and position of any code violation in the dataword, each code violation corresponding to a given bit sequence within the dataword; and decoding means for forming the dataword from the preserved bits and the given bit sequence of each code violation in accordance with the set of pivot bits.

wherein the decoding means decodes by reconstructing, as necessary, any code violation in the dataword as the given bit sequence having the type and at the position as defined by the set of pivot bits, and by assigning the preserved bits to respective locations in the dataword in accordance with the set of pivot bits.

* * * * *